US009663625B2

(12) United States Patent
Gross et al.

(10) Patent No.: US 9,663,625 B2
(45) Date of Patent: May 30, 2017

(54) METHOD FOR PRODUCING MELAMINE/FORMALDEHYDE FOAMS

(71) Applicant: BASF SE, Ludwigshafen (DE)

(72) Inventors: Bernd Gross, Großniedesheim (DE); Horst Baumgartl, Ludwigshafen (DE); Jens-Uwe Schierholz, Bensheim (DE); Bettina Wester, Maxdorf (DE); Peter Wolf, Weinstraße (DE); Bernhard Vath, Mannheim (DE); Peter Nessel, Ludwigshafen (DE); Klaus Hahn, Kirchheim (DE); Tobias Heinz Steinke, Speyer (DE)

(73) Assignee: BASF SE, Ludwigshafen (DE)

( * ) Notice: Subject to any disclaimer, the term of this patent is extended or adjusted under 35 U.S.C. 154(b) by 155 days.

(21) Appl. No.: 14/425,357

(22) PCT Filed: Aug. 23, 2013

(86) PCT No.: PCT/EP2013/067525
§ 371 (c)(1),
(2) Date: Mar. 3, 2015

(87) PCT Pub. No.: WO2014/037233
PCT Pub. Date: Mar. 13, 2014

(65) Prior Publication Data
US 2015/0210814 A1 Jul. 30, 2015

(30) Foreign Application Priority Data
Sep. 4, 2012 (EP) .................................. 12182963

(51) Int. Cl.
C08J 9/00 (2006.01)
B29C 44/20 (2006.01)
C08L 61/28 (2006.01)
C08J 9/14 (2006.01)
C08J 9/30 (2006.01)
B29K 81/00 (2006.01)
B29L 31/00 (2006.01)

(52) U.S. Cl.
CPC ............. C08J 9/0033 (2013.01); B29C 44/20 (2013.01); C08J 9/0023 (2013.01); C08J 9/14 (2013.01); C08J 9/30 (2013.01); C08L 61/28 (2013.01); B29K 2081/00 (2013.01); B29L 2031/00 (2013.01); C08J 2361/28 (2013.01)

(58) Field of Classification Search
CPC ....... B29C 44/20; C08J 9/0023; C08J 9/0033; C08J 9/14; C08J 9/30; C08J 2361/28; C08L 61/28; B29K 2081/00; B29L 2031/00
See application file for complete search history.

(56) References Cited

U.S. PATENT DOCUMENTS

| 4,334,971 | A | 6/1982 | Mahnke et al. |
| 5,837,013 | A | 11/1998 | Guenther et al. |
| 6,608,118 | B2 * | 8/2003 | Kosaka ............... B29C 44/5636 264/321 |
| 7,179,410 | B2 * | 2/2007 | Griffiths .................. B29C 44/52 264/237 |
| 7,714,031 | B2 | 5/2010 | Baumgartl et al. |
| 2008/0139744 | A1 * | 6/2008 | Held ......................... C08F 2/26 524/800 |
| 2008/0197524 | A1 | 8/2008 | Baumgartl et al. |

(Continued)

FOREIGN PATENT DOCUMENTS

CA 1151350 A1 8/1983
CN 101671472 A * 3/2010

(Continued)

OTHER PUBLICATIONS

English abstract CN 101671472, Mar. 2010.*
International Search Report for PCT/EP2013/067525 mailed Dec. 2, 2013.

Primary Examiner — Irina S Zemel
(74) Attorney, Agent, or Firm — Drinker, Biddle & Reath LLP

(57) ABSTRACT

The present invention relates to processes for producing melamine-formaldehyde foams, said processes comprising the steps of:
a) producing an aqueous mixture M1) comprising
 100 parts by weight of at least one melamine-formaldehyde precondensate,
 2 to 4 parts by weight of at least one curative,
 0.2 to 5 parts by weight of a surfactant mixture,
 0.1 to 5 parts by weight of at least one salt of an inorganic acid or one salt of an organic carboxylic acid,
 1 to 40 parts by weight of at least one blowing agent,
 0 to 5 parts by weight of at least one dye and/or optical brightener,
 0 to 20 parts by weight of one or more further additives, and
 25 to 60 parts by weight of water,
b) heating and foaming said mixture M1) using microwave radiation,
c) crosslinking and curing the resulting foam using the curative and microwave radiation,
d) drying the foam using microwave radiation, and
e) annealing the dried foam using hot air,
wherein as essential feature of the present invention said mixture M1) comprises a surfactant mixture comprising a mixture of 50 to 90 wt % of an anionic surfactant and 10 to 50 wt % of a nonionic surfactant, wherein the weight percentages are each based on the total weight of the surfactant mixture,
and also to melamine-formaldehyde foams obtainable by the processes of the present invention and also to uses of said foams.

29 Claims, No Drawings

(56) References Cited

U.S. PATENT DOCUMENTS

| | | | |
|---|---|---|---|
| 2008/0300329 A1* | 12/2008 | Fechtenkotter | C08J 9/42 521/65 |
| 2010/0144913 A1 | 6/2010 | Alteheld et al. | |
| 2011/0237145 A1 | 9/2011 | Steinke et al. | |
| 2012/0071578 A1 | 3/2012 | Baumgartl et al. | |

FOREIGN PATENT DOCUMENTS

| | | |
|---|---|---|
| EP | 17 671 A1 | 10/1980 |
| EP | 17 672 A1 | 10/1980 |
| EP | 37 470 A1 | 10/1981 |
| EP | 074 593 A1 | 3/1983 |
| EP | 1 505 105 A1 | 2/2005 |
| WO | WO-96/20229 A1 | 7/1996 |
| WO | WO-01/94436 A2 | 12/2001 |
| WO | WO-2006/134083 A1 | 12/2006 |
| WO | WO-2008110475 A1 | 9/2008 |
| WO | WO-2012/035457 A1 | 3/2012 |

\* cited by examiner

METHOD FOR PRODUCING MELAMINE/FORMALDEHYDE FOAMS

CROSS-REFERENCE TO RELATED APPLICATIONS

This application is a national stage application (under 35 U.S.C. §371) of PCT/EP2013/067525, filed Aug. 23, 2013, which claims benefit of European Application No. 12182963.4, filed Sep. 4, 2012, both of which are incorporated herein by reference in their entirety.

The present invention relates to processes for producing melamine-formaldehyde foams, said processes comprising the steps of:
  a) producing an aqueous mixture M1) comprising
    100 parts by weight of at least one melamine-formaldehyde precondensate,
    2 to 4 parts by weight of at least one curative,
    0.2 to 5 parts by weight of a surfactant mixture,
    0.1 to 5 parts by weight of at least one salt of an inorganic acid or/or at least one salt of an organic carboxylic acid,
    1 to 40 parts by weight of at least one blowing agent,
    0 to 5 parts by weight of at least one dye and/or optical brightener,
    0 to 20 parts by weight of one or more further additives, and
    25 to 60 parts by weight of water,
  b) heating and foaming said mixture M1) using microwave radiation,
  c) crosslinking and curing the resulting foam using the curative and microwave radiation,
  d) drying the foam using microwave radiation, and
  e) annealing the dried foam using hot air.

The present invention further relates to melamine-formaldehyde foams and also their use.

Open-cell resilient foams based on melamine-formaldehyde resins and also processes for producing said foams by heating with hot air, water vapor or microwave irradiation to foam and crosslink a melamine-formaldehyde precondensate dispersion or solution comprising a blowing agent, followed by a drying and annealing step, are known and described in EP-A 074 593, EP-A 017 671, EP-A 017 672 and EP-A 037 470 for example. Melamine-formaldehyde foams of this type generally have good mechanical properties and good acoustical and thermal insulatability as well as low flammability. Possible emissions of formaldehyde from these melamine-formaldehyde foams under hot moist conditions in particular can be minimized by suitable measures, for example by the addition of formaldehyde scavengers as described in WO 06/134083, or by choosing suitable compositions and processing parameters for the melamine-formaldehyde precondensates, as described in WO 01/94436 and PCT/IB2011/053803 (application number).

In all these known production processes, surfactants/emulsifiers are added to the melamine-formaldehyde precondensates before foaming. Anionic surfactants, cationic surfactants and nonionic surfactants are typically mentioned as suitable surfactants/emulsifiers.

EP-A 017 671 and EP-A 017 672 for instance likewise disclose those three recited groups of anionic, cationic and nonionic surfactants as suitable for producing the melamine-formaldehyde foams, Example 6 in each case utilizing a mixture of more than 90 wt % of an anionic surfactant and less than 10 wt % of a nonionic surfactant in the form of an otherwise unspecified low-ethoxylated saturated alcohol, each percentage being based on the total weight of the surfactants used. Example 8 in each case discloses, by way of surfactant mixture, the use of 27 wt % of an anionic surfactant and 73 wt % of the nonionic surfactant mentioned. All the other examples in the cited documents each only employ an anionic surfactant.

The known melamine-formaldehyde foams are still in need of improvement with regard to the combination of good mechanical properties coupled with high flow resistance (which corresponds to good absorption of sound) and low density.

It is an object of the present invention to provide melamine-formaldehyde foams having an improved combination of mechanical/resilient properties and flow resistances, i.e., acoustical properties, and production processes therefor.

We have found that this object is achieved by the processes recited at the outset for producing melamine-formaldehyde foams, wherein as essential feature of the present invention said mixture M1) comprises a surfactant mixture comprising a mixture of 50 to 90 wt % of an anionic surfactant and 10 to 50 wt % of a nonionic surfactant, wherein the weight percentages are each based on the total weight of the surfactant mixture.

The present invention further provides melamine-formaldehyde foams obtainable by the processes of the present invention and also uses of said foams.

The melamine-formaldehyde foams obtainable by the processes of the present invention exhibit a combination of mechanical/resilient properties and flow resistances, i.e., acoustical properties, which is improved over known foams of this type.

The processes, articles and uses according to the present invention will now be more particularly described.

The processes which the present invention provides for producing melamine-formaldehyde foams comprise the hereinbelow more particularly described steps:
  a) producing an aqueous mixture M1),
  b) heating and foaming said mixture M1) using microwave radiation,
  c) crosslinking and curing the resulting foam using the curative and microwave radiation,
  d) drying the foam using microwave radiation, and
  e) annealing the dried foam using hot air.

Step e) may be followed by a further step, step f), in which the annealed foam is compressed and relaxed one or more times. The foam strand obtained may be cut into foam cuboids preferably after step e) or else after step f), if carried out.

The processes of the present invention are preferably carried out in a continuous manner. Process step a), in which the mixture M1) which is to be foamed is produced, must be carried out before all other process steps. Process steps b), c), d) and e) are carried out essentially in the stated order, but the individual steps are in practice not sharply delimitable from each other; on the contrary, they merge into each other. Thus, even as the foaming of step b) is taking place, there is some slight crosslinking as per step c), while at the same time certain amounts of formaldehyde and water are already being discharged from the foam, in line with step d). Furthermore, for example, the annealing of the dried foam as per step e) is carried out while crosslinking processes in the foam are still going on as per step c), and remnants of water and formaldehyde are still being discharged in the drying of step d). Despite these continuous transitions between the individual operations, the significant features of the processes according to the present invention and the temporal sequence of the particular significant foam-forming processes can be described in terms of the individual steps a) to f) of the processes according to the present invention.

Process step a) comprises producing an aqueous mixture M1) comprising:

100 parts by weight of at least one melamine-formaldehyde precondensate, 2 to 4 parts by weight, preferably 2.2 to 3.8 parts by weight and more preferably 2.7 to 3.3 parts by weight of at least one curative, 0.2 to 5 parts by weight, preferably 0.5 to 3 parts by weight and more preferably 1.25 to 2.3 parts by weight of a surfactant mixture, 0.1 to 5 parts by weight, preferably 0.5 to 4 parts by weight and more preferably 1.1 to 3.6 parts by weight of at least one salt of an inorganic acid or at least one salt of an organic carboxylic acid, 1 to 40 parts by weight, preferably 10 to 35 parts by weight and more preferably 15 to 21 parts by weight of at least one blowing agent, 0 to 5 parts by weight, preferably 0 to 4 parts by weight and more preferably 0 to 3 parts by weight of at least one dye and/or optical brightener, 0 to 20 parts by weight, preferably 0 to 10 parts by weight and more preferably 0 to 5 parts by weight of one or more further additives, and 25 to 60 parts by weight, preferably 30 to 50 parts by weight and more preferably 36 to 44 parts by weight of water, wherein as essential feature of the present invention said mixture M1) comprises a surfactant mixture comprising a mixture of 50 to 90 wt %, preferably 65 to 90 wt % and more preferably 75 to 90 wt % of an anionic surfactant and 10 to 50 wt %, preferably 10 to 35 wt % and more preferably 10 to 25 wt % of a nonionic surfactant, wherein the weight percentages are each based on the total weight of the surfactant mixture.

Any condensation products of melamine and formaldehyde which are known to a person skilled in the art and are described in the literature can in principle be used as melamine-formaldehyde precondensates in process step a). Preference is given to using a melamine-formaldehyde precondensate having a molar ratio of melamine:formaldehyde ranging from 1:1.5 to 1:4, preferably from 1:1.6 to 1:3.5 and more preferably from 1:2 to 1:3. Preferred melamine-formaldehyde precondensates have an average molecular weight (number average) $M_n$ ranging from 200 g/mol to 1000 g/mol, preferably from 200 g/mol to 800 g/mol and more preferably from 200 g/mol to 600 g/mol.

The melamine-formaldehyde precondensate, in addition to melamine and formaldehyde, may comprise up to 50 wt % and preferably up to 20 wt % (both based on the weight of cocondensed melamine) of other thermoset-formers and up to 50 wt % and preferably up to 20 wt % (both based on the weight of cocondensed formaldehyde) of other aldehydes in cocondensed form. Useful thermoset-formers include for example: alkyl- and arylalkyl-substituted melamine, urea, urethanes, carboxamides, dicyandiamide, guanidine, sulfurylamide, sulfonamides, aliphatic amines, glycols, phenol and its derivatives. Examples of useful other aldehydes include acetaldehyde, trimethylolacetaldehyde, acrolein, benzaldehyde, furfurol, glyoxal, glutaraldehyde, phthalaldehyde and terephthalaldehyde. But particular preference is given to melamine-formaldehyde precondensates which apart from melamine comprise essentially no other thermoset-formers and apart from formaldehyde comprise essentially no other aldehydes (i.e., the level of other thermoset-formers and of other aldehydes is in each case less than 1 wt %, based on the weight of the melamine-formaldehyde precondensate). Commercially available melamine-formaldehyde precondensates are useful for a multiplicity of applications, for example for further processing into glues. Melamine-formaldehyde precondensates comprising sulfite groups (the designation "sulfite groups" is often used in the literature and is therefore also retained in this application even though the reaction of, for example, sulfites, hydrogensulfites, disulfites or dithionites with the hydroxymethyl groups of melamine-formaldehyde condensates is likely to produce aminomethanesulfonate groups, see Ullmann's Encyclopedia of Industrial Chemistry, Vol. 3, Hans Diem et al., "Amino Resins", pages. 95-97, Wiley-VCH Verlag GmbH & Co. KGaA, published online 10.15. 2010, DOI: 10.1002/14356007.a02_115.pub2) are advantageous for use in some of these fields of use. Such sulfite group-containing melamine-formaldehyde precondensates are obtainable for example as described in EP-B 37470 whereby from 1 to 20 wt % of sodium hydrogensulfite is incorporated in the course of the condensation of melamine and formaldehyde to obtain cocondensed sulfite groups. Such sulfite group-containing melamine-formaldehyde precondensates are also usable in the processes of the present invention, in which case preferred sulfite group contents, reckoned as $-SO_3$ and based on the total weight of the melamine-formaldehyde precondensate, range from 0.1 to 3 wt %. Melamine-formaldehyde precondensates having a sulfite group content, reckoned as $-SO_3$ and based on the total weight of the melamine-formaldehyde precondensate, of less than 0.1 wt % are referred to as sulfite group free. Further details concerning suitable melamine-formaldehyde precondensates are found for example in Houben-Weyl, Methoden der organischen Chemie, volume 14/2, 1963, pages 319 to 402.

Emulsification of the blowing agent and stabilization of the foam in the processes of the present invention requires the addition of surfactants in step a). According to the present invention, the mixture M1) comprises by way of surfactant mixture a mixture of 50 to 90 wt %, preferably 65 to 90 wt % and more preferably 75 to 90 wt % of an anionic surfactant and 10 to 50 wt %, preferably 10 to 35 wt % and more preferably 10 to 25 wt % of a nonionic surfactant, wherein the weight percentages are each based on the total weight of the surfactant mixture.

Suitable anionic surfactants include for example diphenylene oxide sulfonates, alkane- and alkylbenzenesulfonates, alkylnaphthalenesulfonates, olefinsulfonates, alkanesulfonates, alkyl ether sulfonates, fatty alcohol sulfates, fatty alcohol polyglycol ether sulfates, ether sulfates, alpha-sulfa fatty acid esters, acylaminoalkanesulfonates, acyl isethionates, alkyl ether carboxylates, N-acylsarcosinates, alkyl and alkyl ether phosphates.

Preferred anionic surfactants are salts, preferably alkali metal salts and more preferably sodium salts, of alkanesulfonates, preferably of n-alkanesulfonates and more preferably of n-alkanesulfonates having 13 to 17 carbon atoms in the alkane chain. These alkanesulfonates and their preparation are known to a person skilled in the art and are described in the literature. A preferred method of synthesis is that of sulfoxidation, i.e., the reaction with $SO_2$ and $O_2$, of the desired alkanes, preferably n-alkanes and more preferably n-alkanes of 13-17 carbon atoms, under agency of UV light. This gives preferentially monosulfonates, but a minor amount of di- or polysulfonates is also formed. The sulfonation takes place predominantly on the secondary carbon atoms, since the terminal carbon atoms of alkane chains are distinctly less reactive. Very particularly preferred anionic surfactants accordingly conform to formula (I),

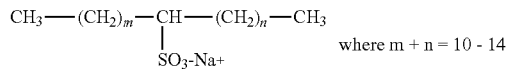

$$CH_3-(CH_2)_m-\underset{SO_3\text{-Na+}}{CH}-(CH_2)_n-CH_3 \quad \text{where } m+n=10\text{-}14 \quad (I)$$

Further preferred anionic surfactants are salts, preferably alkali metal salts and more preferably sodium salts, of fatty alcohol polyglycol ether sulfates, preferably of such fatty alcohol polyglycol ether sulfates as are obtainable by reacting saturated $C_8$-$C_{22}$ fatty alcohols with a 2- to 10-tuply, preferably 4-tuply, molar excess of ethylene oxide and subsequent sulfation. These fatty alcohol polyglycol ether sulfates and their preparation are known to a person skilled in the art and are described in the literature. A further very particularly preferred anionic surfactant corresponds to a fatty alcohol polyglycol ether sulfate of formula (II):

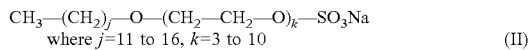

$$CH_3-(CH_2)_j-O-(CH_2-CH_2-O)_k-SO_3Na \\ \text{where } j=11 \text{ to } 16, k=3 \text{ to } 10 \quad (II)$$

Nonionic surfactants useful as a constituent part of the surfactant mixture do not contain any anionic or cationic groups, suitable nonionic surfactants being for example alkylphenol polyglycol ethers, fatty alcohol polyglycol ethers, fatty acid polyglycol ethers, fatty acid alkanolamides, EO-PO block copolymers, nonionic amine oxides, glycerol fatty acid esters, sorbitan esters and alkylpolyglucosides. Preferred nonionic surfactants are alkyl polyethylene glycol ethers, especially those obtainable by reacting a linear saturated $C_{12}$-$C_{18}$ fatty alcohol with a 30- to 120-tuply, preferably 70- to 90-tuply and more preferably 80-tuply molar excess of ethylene oxide. These nonionic surfactants and their preparation are known to a person skilled in the art and are described in the literature.

According to the present invention, the mixture M1) comprises from 0.2 to 5 parts by weight, preferably from 0.5 to 3 parts by weight and more preferably from 1.25 to 2.3 parts by weight of said surfactant mixtures per 100 parts by weight of melamine-formaldehyde precondensate.

In order that a foam may be generated from the aqueous mixture M1) comprising the melamine-formaldehyde precondensate, at least one blowing agent has to be added to said mixture in process step a). The quantity selected in the context of the abovementioned ranges for the amount of blowing agent added depends in general on the density desired for the foam. The process of the present invention can in principle utilize both physical and chemical blowing agents. Useful physical blowing agents include for example hydrocarbons, halogenated, especially fluorinated, hydrocarbons, alcohols, ethers, ketones and esters. Preferred physical blowing agents are physical blowing agents having a boiling point between 0 and 80° C.

It is particularly preferable for the mixture M1) to comprise butane and/or pentane as blowing agent. Very particular preference for use as blowing agent is given to a mixture of 30 to 90 wt % and especially 70 to 85 wt % of n-pentane and 70 to 10 wt % and especially 30 to 15 wt % of iso-pentane, wherein the weight % ages are each based on the total weight of the blowing agent mixture. According to the present invention, the mixture M1) comprises from 1 to 40 parts by weight, preferably from 10 to 35 parts by weight and more preferably from 15 to 21 parts by weight of said blowing agents per 100 parts by weight of melamine-formaldehyde precondensate.

The curative in mixture M1) of process step a) comprises acidic compounds that catalyze the continued condensation of the melamine-formaldehyde precondensate. Organic acids and inorganic acids can be used, examples being hydrochloric acid, sulfuric acid, phosphoric acid, nitric acid, formic acid, acetic acid, oxalic acid, toluenesulfonic acids, amidosulfonic acids and also acid anhydrides. Formic acid is the preferred curative used in the processes of the present invention. According to the present invention, the mixture M1) comprises from 2 to 4 parts by weight, preferably from 2.2 to 3.8 parts by weight and more preferably from 2.7 to 3.3 parts by weight of said curatives per 100 parts by weight of melamine-formaldehyde precondensate.

Process step a) comprises adding one or more salts of an inorganic acid and/or one or more salts of an organic carboxylic acid to the mixture M1). One or more salts, especially sodium and/or potassium salts, of sulfur oxygen acids, of formic acid, of acetic acid and of citric acid are particularly suitable. Chlorides, bromides, nitrates and dihydrogenphosphates are also particularly suitable, especially in the form of the sodium and/or potassium salts. Preference for use as salts of an inorganic acid and/or salts of an organic carboxylic acid is given more particularly to one or more compounds selected from sodium and potassium formates, acetates, citrates, chlorides, bromides, sulfates, sulfites, nitrates and dihydrogenphosphates. Very particularly suitable salts of an inorganic acid and/or salts of an organic carboxylic acid are formates, citrates, and mixtures thereof, especially a mixture of 40 to 90 wt %, preferably 45 to 70 wt % and more preferably 50 to 60 wt % of sodium formate and 10 to 60 wt %, preferably 30 to 55 wt % and more preferably 40 to 50 wt % of sodium citrate, wherein the weight percentages are each based on the total weight of the sodium formate and sodium citrate.

According to the present invention, the mixture M1) comprises from 0.1 to 5 parts by weight, preferably from 0.5 to 4 parts by weight and more preferably from 1.1 to 3.6 parts by weight of said salts of an inorganic acid and/or said salts of an organic carboxylic acid per 100 parts by weight of melamine-formaldehyde precondensate.

There are some applications where it is desirable that the melamine-formaldehyde foams which are obtainable by the processes of the present invention and which are intrinsically colorless be colored. To produce colored melamine-formaldehyde foams, in principle any dyes known to a person skilled in the art and described in the literature can be added to the aqueous mixture M1) in step a) of the processes according to the present invention. The term dyes comprises not only such dyes as are soluble in the aqueous mixture M1) but also colored pigments, which are insoluble in the mixture M1). But pigments generally have a disruptive effect on the foaming process.

Therefore, soluble dyes are preferably used in the mixture M1) in order that any impairment of the foaming operation may be prevented as far as possible. Dyes particularly suitable for use in the processes of the present invention are exhaustively described in WO 96/20229. In addition to or in lieu of dyes, optical brighteners can also be added to the mixture M1). Optical brighteners are compounds that absorb light in the UV region and have a fluorescent emission at wavelengths in the range from 400 to 500 nm. According to the present invention, the mixture M1) comprises from 0 to 5 parts by weight, preferably from 0 to 4 parts by weight and more preferably from 0 to 3 parts by weight of said dyes and/or optical brighteners per 100 parts by weight of melamine-formaldehyde precondensate.

The use of optical brighteners is preferable to inhibit a yellow cast on the part of undyed melamine-formaldehyde foams (the yellow cast being the result for example of choosing melamine-formaldehyde precondensates having high sulfite contents as feedstock or choosing high temperatures in steps d) or e)). When colored melamine-formaldehyde foams are to be produced, the addition of at least one optical brightener to the mixture M1) in addition to one or more dyes is preferable, for example in order to effect brightening and/or brilliancy enhancement of the color. When optical brighteners are used, for example for the reasons mentioned, they are more particularly added to the mixture M1) in amounts of 0.1 to 5 parts by weight per 100 parts by weight of melamine-formaldehyde precondensate. Suitable optical brighteners are likewise described in the literature and known to a person skilled in the art. Preference for use as optical brighteners is given to compounds derived from stilbene, e.g., the alkylation products of 4,4''-diaminostilbene-2,2'-disulfonic acid, naphthalimides, especially N-methyl-4-methoxynaphthalimide.

The aqueous mixture M1) prepared as per process step a) is preferably free from further additives. However, it can be beneficial for some purposes to use a mixture M1) comprising from 0 to 20 parts by weight, preferably from 0 to 10 parts by weight and more preferably from 0 to 5 parts by weight of further additives per 100 parts by weight of melamine-formaldehyde precondensate. Examples of further additives which can be used in such amounts are: flame retardants, additives which in the event of a fire have an intumescent effect and/or promote carbonization, additives to lower combustion gas toxicity, formaldehyde scavengers. UV stabilizers and thermal stabilizers. Especially when sulfite group-containing melamine-formaldehyde precondensates are used, the mixture M1) advantageously comprises UV stabilizers and/or thermal stabilizers in the recited amounts, especially in amounts from 0.01 to 5, preferably from 0.03 to 0.5 and more preferably from 0.05 to 0.3 part by weight. It is particularly advantageous when the mixture M1) comprising sulfite group-containing melamine-formaldehyde precondensates comprises by way of further additive basic copper carbonate, x $CuCO_3 \cdot Cu(OH)_2$ where x=1 or 2, in the recited amounts, which has a UV- and heat-stabilizing effect. Compounds useful as further additives are as such known to a person skilled in the art and described in the literature.

The concentration of melamine-formaldehyde precondensates in the mixture M1), which can be in the form of a solution or in the form of a dispersion, can be adjusted via the amount of water present in the mixture. According to the present invention, the mixture M1) comprises from 25 to 60 parts by weight, preferably from 30 to 50 parts by weight and more preferably from 36 to 44 parts by weight of water per 100 parts by weight of melamine-formaldehyde precondensate. The preferred viscosity of mixture M1) is between 1 and 3000 dPa s and preferably between 5 and 2000 dPa s (all at 20° C.).

A preferred aqueous mixture M1) obtained in process step a) on the basis of sulfite group-free melamine-formaldehyde precondensate comprises:

100 parts by weight of sulfite group-free melamine-formaldehyde precondensate having a molar ratio of melamine:formaldehyde ranging from 1:1.5 to 1:4, preferably from 1:1.6 to 1:3.5 and more preferably from 1:2 to 1:3 and an average molecular weight (number average) $M_n$ ranging from 200 g/mol to 1000 g/mol, preferably from 200 g/mol to 800 g/mol and more preferably from 200 g/mol to 600 g/mol, which comprises up to 50 wt % and preferably up to 20 wt % (both based on the weight of cocondensed melamine) of other thermoset-formers and up to 50 wt % and preferably up to 20 wt % (both based on the weight of cocondensed formaldehyde) of other aldehydes, but most preferably comprises essentially no other thermoset-formers in addition to melamine and essentially no other aldehydes in addition to formaldehyde, from 2 to 4 parts by weight, preferably from 2.2 to 3.8 parts by weight and more preferably from 2.7 to 3.3 parts by weight of at least one inorganic or organic acid, preferably formic acid, as curative, from 0.2 to 5 parts by weight, preferably from 0.5 to 3 parts by weight and more preferably from 1.25 to 2.3 parts by weight of a surfactant mixture comprising from 50 to 90 wt %, preferably from 65 to 90 wt % and more preferably from 75 to 90 wt % of at least one anionic surfactant, preferably an alkali metal n-alkanesulfonate having 13 to 17 carbon atoms in the alkyl chain, and most preferably an anionic surfactant conforming to formula (I),

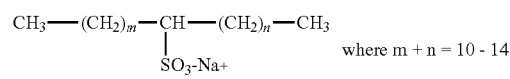

(I)

$$CH_3-(CH_2)_m-\underset{SO_3\text{-}Na^+}{CH}-(CH_2)_n-CH_3 \quad \text{where } m+n=10-14$$

and from 10 to 50 wt %, preferably from 10 to 35 wt % and more preferably from 10 to 25 wt % of at least one nonionic surfactant, especially of an alkyl polyethylene glycol ether obtainable by reacting a linear saturated $C_{12}$-$C_{18}$ fatty alcohol with a 30- to 120-tuply, preferably 70- to 90-tuply and more preferably 80-tuply molar excess of ethylene oxide, wherein the weight percentages are each based on the total weight of the surfactant mixture, from 0.1 to 5 parts by weight, preferably from 0.5 to 4 parts by weight, more preferably from 1.1 to 3.6 parts by weight and especially from 2.2 to 3.6 parts by weight of at least one salt of an inorganic acid and/or at least one salt of an organic carboxylic acid, preferably of a formate, citrate or a mixture of formates and citrates, more preferably of mixtures comprising 40 to 90 wt %, preferably from 45 to 70 wt % and more preferably from 50 to 60 wt % of sodium formate and from 10 to 60 wt %, preferably from 30 to 55 wt % and more preferably from 40 to 50 wt % of sodium citrate, wherein the weight percentages are each based on the total weight of the sodium formate and sodium citrate, from 1 to 40 parts by weight, preferably from 10 to 35 parts by weight and more preferably from 15 to 21 parts by weight of at least one blowing agent, preferably of a physical blowing agent having a boiling point between 0 and 80° C., more preferably butane, pentane or a mixture comprising butane and pentane and most preferably a blowing agent mixture comprising 30 to 90 wt % and especially 70 to 85 wt % of n-pentane and 70 to 10 wt % and especially 30 to 15 wt % of isopentane, wherein the weight % ages are each based on the total weight of the blowing agent mixture, from 0 to 5 parts by weight, preferably from 0 to 4 parts by weight and more preferably from 0 to 3 parts by weight of at least one dye and/or optical brightener, from 0 to 20 parts by weight, preferably from 0 to 10 parts by weight and more preferably from 0 to 5 parts by weight of one or more further additives, and from 25 to 60 parts by weight, preferably from 30 to 50 parts by weight and more preferably from 36 to 44 parts by weight of water.

A preferred aqueous mixture M1) obtained in process step a) on the basis of sulfite group-containing melamine-formaldehyde precondensate comprises:

100 parts by weight of melamine-formaldehyde precondensate having a sulfite group content, reckoned as —SO$_3$ and based on the total weight of melamine-formaldehyde precondensate, ranging from 0.1 to 3 wt % and having a molar ratio of melamine:formaldehyde ranging from 1:1.5 to 1:4, preferably from 1:1.6 to 1:3.5 and more preferably from 1:2 to 1:3 and an average molecular weight (number average) M$_n$ ranging from 200 g/mol to 1000 g/mol, preferably from 200 g/mol to 800 g/mol and more preferably from 200 g/mol to 600 g/mol, which comprises up to 50 wt % and preferably up to 20 wt % (both based on the weight of cocondensed melamine) of other thermoset-formers and up to 50 wt % and preferably up to 20 wt % (both based on the weight of cocondensed formaldehyde) of other aldehydes, but most preferably comprises essentially no other thermoset-formers in addition to melamine and essentially no other aldehydes in addition to formaldehyde, from 2 to 4 parts by weight, preferably from 2.2 to 3.8 parts by weight and more preferably from 2.7 to 3.3 parts by weight of at least one inorganic or organic acid, preferably formic acid, as curative, from 0.2 to 5 parts by weight, preferably from 0.5 to 3 parts by weight and more preferably from 1.25 to 2.3 parts by weight of a surfactant mixture comprising from 50 to 90 wt %, preferably from 65 to 90 wt % and more preferably from 75 to 90 wt % of at least one anionic surfactant, preferably an alkali metal n-alkanesulfonate having 13 to 17 carbon atoms in the alkyl chain, and most preferably an anionic surfactant conforming to formula (I),

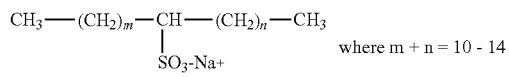

$$CH_3-(CH_2)_m-\underset{SO_3\text{-Na+}}{CH}-(CH_2)_n-CH_3 \quad \text{where } m+n = 10 - 14 \qquad (I)$$

and from 10 to 50 wt %, preferably from 10 to 35 wt % and more preferably from 10 to 25 wt % of at least one nonionic surfactant, especially of an alkyl polyethylene glycol ether obtainable by reacting a linear saturated C$_{12}$-C$_{18}$ fatty alcohol with a 30- to 120-tuply, preferably 70- to 90-tuply and more preferably 80-tuply molar excess of ethylene oxide, wherein the weight percentages are each based on the total weight of the surfactant mixture, from 0.1 to 5 parts by weight, preferably from 0.5 to 4 parts by weight, more preferably from 1.1 to 3.6 parts by weight and especially from 1.1 to 1.9 parts by weight of at least one salt of an inorganic acid and/or at least one salt of an organic carboxylic acid, preferably of at least one formate, citrate or a mixture thereof, more preferably of mixtures comprising 40 to 90 wt %, preferably from 45 to 70 wt % and more preferably from 50 to 60 wt % of sodium formate and from 10 to 60 wt %, preferably from 30 to 55 wt % and more preferably from 40 to 50 wt % of sodium citrate, wherein the weight percentages are each based on the total weight of the sodium formate and sodium citrate, from 1 to 40 parts by weight, preferably from 10 to 35 parts by weight and more preferably from 15 to 21 parts by weight of at least one blowing agent, preferably of a physical blowing agent having a boiling point between 0 and 80° C., more preferably butane, pentane or a mixture comprising butane and pentane and most preferably a blowing agent mixture comprising 30 to 90 wt % and especially 70 to 85 wt % of n-pentane and 70 to 10 wt % and especially 30 to 15 wt % of isopentane, wherein the weight % ages are each based on the total weight of the blowing agent mixture, from 0 to 5 parts by weight, preferably from 0 to 4 parts by weight and more preferably from 0 to 3 parts by weight of at least one dye and/or optical brightener, especially from 0.1 to 5 parts by weight of an optical brightener, preferably of an optical brightener which derives from stilbene, especially from an alkylation product of 4,4'-diaminostilbene-2, 2'-disulfonic acid, or which is a naphthalimide, from 0 to 20 parts by weight, preferably 0 to 10 parts by weight and more preferably from 0 to 5 parts by weight of one or more further additives, especially from 0.01 to 5, preferably from 0.03 to 0.5 and more preferably from 0.05 to 0.3 part by weight of at least one UV and/or heat stabilizer, preferably of a basic copper carbonate, x CuCO$_3$.Cu(OH)$_2$ where x=1 or 2, from 25 to 60 parts by weight, preferably from 30 to 50 parts by weight and more preferably from 36 to 44 parts by weight of water.

Step a) of the processes according to the present invention comprises producing the mixture M1) from the components mentioned. This can in principle be accomplished using any mixing devices and mixing processes known to a person skilled in the art and described in the literature. Suitable mixing devices are described for example in "Mischen beim Herstellen and Verarbeiten von Kunststoffen", H. Pahl, Vdl-Verlag 1986, and in Saechtling, Kunststofftaschenbuch, Carl Hanser Verlag Munich, Vienna, 29th edition, 2004. Suitable mixing devices include for example extruders and dynamic and static mixers, for example stirred tanks, single-shaft stirrers with stripping devices, especially paste stirrers, multi-shaft stirrers, especially PDSM mixers, solids mixers and also mixing-kneading reactors (e.g., ORP, CRP, AP. DTP from List and Reaktotherm from Krauss-Maffei), twin-trough kneader (trough mixer) and ram kneader (internal mixer) or rotor/stator systems (e.g., Dispax from Ika), loop reactors or packed or baffled tubular mixers. The mixing devices can be charged as usual in a continuous or batch manner. Pulverulent components can be introduced in free flow, for example via a differential metering balance. Plastically deformable materials, for example high-viscosity sub-mixtures comprising melamine-formaldehyde precondensate and not much water, can be fed directly from an extruder or via a gear pump which is advantageous at high viscosities and high pressures in particular. Liquid media can be added via a suitable pumping assembly. It is possible in principle to mix all components, i.e., melamine-formaldehyde precondensate, curative, surfactant mixture, salts of an inorganic acid and/or salts of an organic carboxylic acid, blowing agents, water and—if present—dyes and/or optical brighteners and/or further additives—with one another at the same time in the recited amounts and to feed the mixture M1) thus formed into the following steps. But it is also possible for two or more of said components to be premixed and the still missing components to be admixed simultaneously or in succession. It is similarly possible to add each of the recited components all at once to the mixture M1), but the individual components can also be added to the mixture M1) in the form of two or more sub-amounts.

In one preferred embodiment of the processes according to the present invention, step a) comprises the mixture M1) being admixed before step b) is carried out with one or more gases that are unreactive with regard to the components of mixture M1), for example noble gases, preferably air and/or nitrogen, for explosion protection and economic reasons preferably nitrogen. This admixing of gas can take place either into the ready-produced mixture M1), but also into individual components or sub-mixtures of individual components of mixture M1). This admixing with a gas, especially with air and/or nitrogen, preferably nitrogen, is effected using devices known to a person skilled in the art, for example by injecting via compressors and dies, preferably under pressure. The admixed gases are partly in the form of a solution in mixture M1), partly they form a dispersion of finely divided bubbles, preferably having an average bubble diameter ($D_{50}$, number-averaged) of 10 to 50 µm, especially 20 to 30 µm. The proportion of dissolved/dispersed quantities of gas is dependent on temperature, pressure and viscosity conditions and also the flow rates. These gases in mixture M1), such as air and/or nitrogen, preferably nitrogen, are effective in the subsequent foam-forming process as nucleators for bubble formation.

In one preferred embodiment of the processes according to the present invention said mixture M1) is produced in step a) by producing a first sub-mixture from water, melamine-formaldehyde precondensate and salts of an inorganic acid and/or salts of an organic carboxylic acid in a stirred tank, producing a second sub-mixture from the surfactant mixture and the blowing agent in a static or dynamic mixer, then mixing the two sub-mixtures and, if present, dye and/or optical brightener and further additives together in an extruder or some other dynamic mixer, and finally adding the curative in a further static or dynamic mixer. In a more particular embodiment of the production of mixture M1) as per process step a), air and/or nitrogen is mixed in during the step of producing the second sub-mixture in the static or dynamic mixer and/or during the step of mixing the two sub-mixtures in the extruder or other dynamic mixer.

In one particularly preferred embodiment of the processes according to the present invention, step a) comprises a continuous operation of mixing the total amount of melamine-formaldehyde precondensate and the total amount of water and the total amount of salts of an inorganic acid and/or salts of an organic carboxylic acid and a sub-quantity of the previously separately prepared surfactant mixture, preferably from 5 to 20 wt % of the total surfactant mixture and—if present—the total amount of dyes and/or optical brighteners and further additives at atmospheric pressure and at a temperature ranging from 0 to 50° C., preferably from 20 to 40° C. and more preferably from 25 to 35° C. in a stirred tank using downwardly or upwardly, preferably downwardly, acting stirring elements, especially one or more stirring paddles, stirring vanes or stirring fingers. Concurrently with the production of this sub-mixture in a stirred tank, a second sub-mixture is produced in a technically separate way by the total amount of blowing agent and a sub-quantity of the previously separately prepared surfactant mixture, preferably 80 to 95 wt % of the entire surfactant mixture, being mixed with each other in a static mixer, preferably a packed tube, at a pressure of 2 to 20 bar and a temperature of 0 to 30° C., preferably 0 to 15° C. by means of metering pumps in each case, while it is particularly preferable for air and/or nitrogen, preferably nitrogen, to be continuously blown into this second sub-mixture at a pressure of 3 to 30 bar. The sub-mixture obtained in a stirred tank and the sub-mixture obtained in a static mixer are continuously fed to a twin-screw extruder and mixed together at temperatures of 0 to 80° C., preferably initially 0 to 20° C., later 50 to 70° C., and a pressure of 2 to 20 bar, preferably 5 to 15 bar. This mixture is discharged from the twin-screw extruder and fed directly to a static or dynamic mixer, preferably a static mixer, in which the total amount of curative is metered in at the same time as mixture M1) is formed. The mixing of all components to form mixture M1) takes place in this static or dynamic mixer at temperatures of generally 40 to 90° C., preferably 50 to 80° C. and more preferably 60 to 70° C. and a pressure of 2 to 30 bar, preferably 3 to 20 bar. The blowing agent forms a finely divided dispersion in said mixture M1), preferably of finely divided droplets having an average particle diameter ($D_{50}$, number-averaged) ranging from 1 to 10 µm, preferably 4 to 6 µm.

The mixture M1) obtained in step a) of the processes according to the present invention is then, in one preferred embodiment, fed via one or more dies, preferably at a flow rate of 200 to 1200 kg/h and more preferably of 350 to 900 kg/h, in a continuous manner to a preferably horizontally disposed foaming channel in which process steps b), c), d) and e) are carried out in a continuous manner. The mixture M1) about to be injected is under a pressure of 2 to 30 bar, preferably 3 to 20 bar, and has a temperature which is above the boiling point of the blowing agent at atmospheric pressure, generally at 40 to 90° C., preferably 50 to 80° C. and more preferably 60 to 70° C., so the injection of mixture M1) into the foaming channel, which is preferably under atmospheric pressure or—to ideally prevent the egress of gases from the foaming channel—has a low negative pressure, which is preferably from 1 to 10 mbar below atmospheric pressure, is accompanied by a sudden change in pressure whereby, augmented by the microwave heating described hereinbelow, the blowing agent and any non-reactive gases added vaporize and the mixture M1) foams up.

The foaming channel is formed by a backwall wherethrough said mixture M1) is fed to the foaming channel using one or more dies, and four sidewalls which adjoin the backwall and which are disposed perpendicularly to each other, so they form a closed right-angled cross section, and the foaming channel is open at the side opposite the backwall. Preferably, the mixture M1) is fed to the foaming channel via only one die. The die is preferably disposed in the lower third of the backwall and centrally between the two lateral sidewalls of the foaming channel. The die may be, for example, circular, elliptical or right-angled and is preferably a slot die. Process step b) of heating and foaming the mixture M1) using the hereinbelow described microwave radiation is preferably carried out directly after the mixture M1) has been jetted into the foaming channel. The foam strand forming in the foaming channel in process step a) is then transported through the foaming channel, in which the further steps b), c), d) and e) are carried out in a continuous manner. The four sidewalls of the foaming channel can be static, i.e., immobile, in principle, although this means that the only way the strand of foam can be transported through the foaming channel is due to the forward feed of the continuously fed and foaming mixture M1), and this will generally always lead to blockages of the foaming channel. In one preferred embodiment of the processes according to the present invention, therefore, the four sidewalls of the foaming channel are embodied as belts moving at a preferably constant speed, which is preferably the same for all four belts, ranging from 0.2 m/min to 2 m/min, especially from 0.6 to 1.6 m/min, from the dosing point of mixture M1) in the direction of the open side of the foaming channel. It is particularly preferable for the belts to be made circulating, i.e., each and every belt forming a sidewall is a circulating belt. The sidewalls of the foaming channel, preferably the belts, should by reason of the microwave radiation used in steps b), c) and d) have a very high transparency to this microwave radiation and have a very high resistance to this microwave radiation. Preferably, the sidewalls, especially the belts, of the foaming channel consist of a polyolefin or a polyester. The stability can be improved by the movable belts being supported and/or guided by external supporting walls, for example supporting metal sheets, and/or suitable guiding devices, for example rails. The connecting points where the sidewalls adjoin each other or the backwall can be sealed off with devices and methods known to a person skilled in the art, for example resilient or slidable gaskets, especially silicone gaskets, or plugging beads against gas ingress or egress, any inadvertent escape of microwave radiation can be engendered for example by resilient silicone tubes or beads sheathed with woven metal. Each and every sidewall of the foaming channel, including especially in its embodiment as a belt, can have a single-piece construction over the entire length of the foaming channel, i.e., from the backwall of the foaming channel to the opposite open end of the foaming channel, for example as a belt which circulates along the entire length of the foaming channel; each and every sidewall, however, can also consist of two or more connected segments, for example of two or more circulating belts disposed in series; the advantage of a sidewall embodiment which is not in one piece is that it is particularly simple to dispose devices between two segments of this sidewall, for example openings or doors, via which the foaming channel may be accessed, for example in order that in the event of faults the foam strand may be wholly or partly removed from the foaming channel or in order that samples of the foam strand may be taken in ongoing operation. The backwall of the foaming channel can in principle consist of any microwave-resistant material, preferably the backwall also consists of a polyolefin or a polyester. The backwall can be varied within wide ranges as far as its shape is concerned and may be constructed for example as a planar perpendicularly disposed surface, but it can also be a convex surface protruding into the foaming channel. In one particularly preferred embodiment, the foam-adjacent sides of the sidewalls and/or the backwall comprise an anti-stick layer, especially a polyorganosiloxane or polytetrafluoroethane coating, or elements which are removable or exchangeable in ongoing operation, especially paper or foils of polymer (so-called sacrificial foils), to reduce or avoid foam sticking, in which case these devices for reducing or avoiding sticking are known as such, for example from PU foam production, to a person skilled in the art. The foaming channel which forms the outer shape, especially the width and height, of the strand of foam preferably comprises a rectangular cross section and preferably has a width ranging from 1.0 m to 2.0 m and a height ranging from 0.3 m to 0.7 m. The length of the foaming channel is typically in the range from 30 m to 70 m and preferably in the range from 40 m to 60 m. There are no in-principle restrictions in respect of the width and height of the foaming channel, but the recited dimensions are preferred in commercial practice, since the production of very high-volume strands of foam is desirable from economic points of view, yet the foaming, drying and annealing operation conducted in steps b), c), d) and e) is limited in respect of the homogeneity of the material. The length of the foaming channel is likewise not subject to any in-principle restrictions, but should be as short as possible for economic considerations, although performing process steps a) to e) does require certain times for the strand of foam to reside in the foaming channel owing to which the recited lengths for the foaming channel are preferred.

The outer wall of at least one sidewall, preferably the outer walls of two or more sidewalls and more preferably the outer walls of the top side and the bottom side, of the foaming channel are equipped with, per sidewall, two or more devices, especially magnetrons, for irradiation of the microwave radiation used in steps b), c) and d). The individual devices for irradiation of microwave radiation are further preferably spaced apart from each other by an amount which corresponds to the wavelength of the irradiated microwave radiation. In one particularly preferred arrangement of the devices for irradiation of microwaves, each outside surface of the upper sidewall and of the lower sidewall of the foaming channel comprises two rows of 2 to 30, especially 10 to 20 irradiation devices, wherein the individual irradiation devices are separated from one another by a distance which corresponds to the wavelength of the irradiated microwave radiation. These rows are preferably offset relative to one another by from 20 to 80 cm in order that any mutual influencing of the irradiated radiation may be kept to a minimum. The distance between the backwall of the foaming channel with the at least one die arranged therein, through which the mixture M1 is fed into the foaming channel, and the first device for irradiation of microwave radiation should be in the range from 10 cm to 200 cm and especially in the range from 100 to 150 cm in order that the mixture M1 emerging from the die and foaming up may be exposed as soon as possible to the energy input in the form of microwave radiation while at the same time a homogeneous distribution may be ensured. The devices for irradiation of microwave radiation are preferably disposed along the entirety of that length of the foaming channel that is provided to conduct the process steps b), c) and d). It is particularly preferable for the heating and foaming of mixture M1) as per process step b) to take place essentially in a range from 0 to 30% of the overall length of the foaming channel; for the crosslinking and curing of the product foam as per process step c) to take place essentially in a subsequent region amounting to 10 to 50% of the overall length of the foaming channel; for the drying of the foam as per process step d) to take place essentially in a subsequent region amounting to from 30 to 70% of the total length of the foaming channel; and for the annealing of the dried foam as per process step e) to take place essentially in a final region amounting to 40 to 100% of the overall length of the foaming channel; wherein the percent values mentioned relate to the overall length of the foaming channel and 0% represents the backwall of the foaming channel and 100% represents the open end, opposite the backwall, of the foaming channel and the above formulations "essentially" reflect the fact that, as already elucidated at the beginning, the individual steps b) to e) are in practice not sharply delimited from each other, but to a certain extent transition into each other continuously and, in temporal terms, occur concurrently. Preferably, the irradiation intensity of each and every device for irradiation of microwave radiation can be controlled independently. The processes of the present invention can in principle utilize microwaves in the frequency range from 0.2 GHz to 100 GHz. Frequencies of 0.915, 2.45 and 5.8 GHz are available for industrial practice, of which 2.45 GHz is particularly preferred. Advantageously, the microwave irradiation is carried out such that the energy absorbed by the foam across the full length, in which process steps b), c) and d) take place, of the foaming channel is between 5 and 2000 Wh and preferably between 500 and 1500 Wh, based on 1 kg of water in the mixture M1).

Process step e) comprises annealing the dried foam with hot air having a temperature ranging from 150° C. to 290° C., preferably from 160° C. to 280° C. and more preferably from 170 to 270° C. and having a preferred flow rate ranging from 500 to 5000 S.T.P. $m^3/m^2$ of permeated foam area/h (where S.T.P. conditions conform to DIN 1343). The region of the foaming channel envisioned for performing process step e) is for this equipped on at least one side with at least one feed air device, wherethrough the hot air is blown into the foaming channel, and on at least one other side with at least one exit air device, wherethrough the hot air is removed from the foaming channel. In one preferred embodiment, the foaming channel is equipped with one or more feed air devices on one side, preferably the top side, and with one or more exit air devices on the opposite side, preferably the bottom side, so the open-cell foam can be completely rinsed through by the stream of hot air. It is particularly preferable for the hot stream of air to be recirculated by circulating fans and thereby be repeatedly blown through the foam strand.

The following processes occur as essential chemical and/or physical processes in steps b) to e), in respect of which it may be pointed out once more that the individual steps are in practice not sharply delimited from each other but to a certain degree transition into each other continuously and/or take place concurrently: In step b), the jetting of mixture M1) into the foaming channel and the abrupt change of pressure which occurs in the process is followed because of the thermal energy in the mixture M1) and the incident microwave energy, by the blowing agent vaporizing and any added nonreactive gases, especially air and/or nitrogen, escaping, which leads to a foaming up of the mixture M1) to form an essentially still uncrosslinked, closed-cell melamine-formaldehyde foam. This foaming process should take place with a very uniform increase in volume, i.e., ideally without, for example, the foam front periodically expanding and collapsing, as is ensurable by appropriate control of the feed of mixture M1), the irradiated microwave energy and the speed of the preferably moving sidewalls of the foaming channel within the limits of the parameters described in each case. In process step c), the curative triggers what is essentially the product foam undergoing crosslinking and curing through irradiation of microwave energy by amino and N-methylol groups in the melamine-formaldehyde precondensate reacting with one another by releasing water; this step c) itself, but mainly the subsequent step d), also witnesses the cell walls of the foam opening/bursting to form an open-cell foamed structure comprising melamine-formaldehyde struts and the corresponding interspaces. In process step d), what takes place essentially, through irradiation of microwave energy, is the product foam undergoing drying, i.e., the main quantities of the volatile constituents in the foam such as blowing agent, water, formaldehyde and curative being expelled. Process step e) comprises feeding hot air to evolve formaldehyde from N-methylol groups still chemically attached in the foam. During steps d) and e), the strand of foam suffers an approximately 10% shrinkage in volume due to the removal of the substances mentioned, in relation to the maximum volume of the foam at the end of process step c), and is taken account of in one particularly preferred embodiment of the present invention through an appropriate reduction in the above-described width and height for the foaming channel.

Said heating and foaming said mixture M1) as per step b) is generally effected in a temperature range from 40° C. to 100° C., preferably from 50° C. to 90° C. and more preferably from 60 to 90° C. Crosslinking and curing the resulting foam as per step c) is generally effected in a temperature range from 50° C. to 110° C., preferably from 60° C. to 100° C. and more preferably from 70 to 100° C. Said drying the foam as per step d) is generally effected in a temperature range from 100° C. to 200° C., preferably from 110° C. to 180° C. and more preferably from 110 to 150° C. Said annealing the dried foam as per step e) is generally effected in a temperature range from 150° C. to 290° C., preferably from 160° C. to 280° C. and more preferably from 170 to 270° C.

Said heating and foaming said mixture M1) as per step b) is generally effected over a period of from 0.1 min to 4 min, preferably from 0.1 min to 3.5 min and more preferably from 0.1 min to 3 min.

Crosslinking and curing the resulting foam as per step c) is generally effected over a period of from 2 min to 40 min, preferably from 5 min to 30 min and more preferably from 10 min to 20 min. Said drying the foam as per step d) is generally effected over a period of from 2 min to 40 min, preferably from 5 min to 30 min and more preferably from 10 min to 20 min.

Said annealing the dried foam as per step e) is generally effected over a period of from 15 min to 150 min, preferably from 20 to 80 and more preferably from 30 to 50.

In one preferred embodiment of the present invention, the foaming channel is supplied with air and/or nitrogen, especially air and nitrogen, via one or more feed points and rid of off-gases via one or more removal points. It is very particularly preferable for air to be supplied to the foaming channel in the regions in which process steps b), c) and e) take place, via two or more feed points, with off-gases being removed via two or more removal points. Process step d) comprises feeding nitrogen via two or more feed points and removing off-gases via two or more removal points. The air and/or nitrogen, especially air and nitrogen, supplied to the foaming channel is preferably preheated, more preferably to the aforementioned temperatures at which process steps b), c) and d) are each carried out and augmented in process step e) by additional heating and recirculation of hot air through the foam strand. The purpose of this feeding and recirculating of air and/or nitrogen, especially air and nitrogen, is the improved removal of volatile compounds, but especially an increased level of safety for the processes of the present invention, since the supply of air and/or nitrogen, especially air and nitrogen, leads to a lower concentration of flammable/ignitable substances, and in the case of nitrogen being supplied also to an inertization of the gas phase within the foaming channel. It is likewise for safety reasons that, in a further preferred embodiment of the present invention, the blowing agent content of the off-gases removed from the foaming channel is determined using measuring devices. Suitable measuring devices, preferably those based on infrared spectroscopy, especially inline or online IR spectroscopy, are known per se to a person skilled in the art and are described in the literature. The blowing agent content thus determined serves, via regulating devices known per se to a person skilled in the art and described in the literature, as control variable for the air and/or nitrogen feed stream, to be precise more preferably such that the air and/or nitrogen feed stream into the foaming channel is always of at least such a magnitude that the lower explosion limit of the blowing agent or the oxygen concentration limit in the off-gas stream and in the foaming channel is not breached. The off-gases removed from the foaming channel are preferably disposed via a combustion device known per se to a person skilled in the art and described in the literature, especially a burn chamber.

The annealed strand of foam obtained after step e) is typically severed by suitable cutting devices, for example blades, saws or hot wires, preferably perpendicularly to the direction of the foaming channel to obtain foam cuboids having a width and height dictated by the dimensions of the foaming channel. The foam cuboids following the severing of the strand of foam preferably have the following dimensions: a width ranging from 1.0 m to 1.5 m, a height ranging from 0.3 m to 0.7 and a length ranging from 1.5 m to 2.5 m.

Before or optionally after the above-described severing of the annealed strand of foam using cutting devices, but at any rate after process step e) has been carried out, the processes of the present invention comprise a step f) in which the annealed foam is one or more times compressed down to half or less of its initial height, preferably to from 5% to 50% and more preferably to from 10% to 20% of its initial height, and allowed to recover to its initial height. This operation of compression will cause some of the struts forming the open-cell scaffolding of the foam to break, which enhances the resilience of the foam. This operation of compression to elasticize melamine-formaldehyde foams is known in principle to a person skilled in the art and is described in the literature, for example in EP-A 1 505 105 and EP-B 37470.

The melamine-formaldehyde foams obtainable by the processes of the present invention have densities between 4 and 50 g/l, preferably between 4 and 20 g/l, and the tensile strength values for densities between 8 and 11 g/l are above 100 kPa, measured as per DIN EN ISO 1798. The melamine-formaldehyde foams obtainable by the processes of the present invention have an open-cell structure with an open-cell content, as measured to DIN ISO 4590, of more than 80% and especially more than 90%. The average pore diameter is preferably in the range from 10 to 1000 μm and especially in the range from 50 to 500 μm ($D_{50}$ value, number-averaged, determined using light or electron microscopy combined with image analysis).

The melamine-formaldehyde foams obtainable by the processes of the present invention in strand or cuboid form can be cut into all desired sheet, sheeting or foil thicknesses. It is also possible to use cutting and milling processes known to a person skilled in the art to produce a very wide variety of shaped articles. The melamine-formaldehyde foams can also be one- or both-sidedly laminated or clad with covering layers, for example with paper, paperboard, glass mat, wood, gypsum board, metal sheets or foils, polymeric foils, which may optionally also be in a foamed state.

The main field of use for the melamine-formaldehyde foams obtained according to the present invention is acoustical and/or thermal insulation in aircraft, ship and motor vehicle construction, in mechanical engineering or in building construction, especially the heat insulation and sound insulation of buildings and parts of buildings, especially of interwalls; further the heat insulation and sound insulation of engine and interior spaces of vehicles and aircraft and also low-temperature insulation, for example of cold rooms, oil tanks and containers of liquefied gas including LNG carriers. Owing to their high open-cell content, these foams are useful for absorbing and storing liquids of any kind. They can appreciably reduce undesired sloshing around of comparatively large quantities of liquid in moving tanks (aircraft, ships, motor vehicles). Further fields of application are the use as insulating wallcovering and also as insulating and shock-absorbing packaging material. Owing to the high hardness of the melamine resin, these foams are also useful as highly efficacious cleaning means, for example for cleaning, grinding and polishing sponges having a slightly abrasive effect. The open-cell structure of the foams additionally permits the absorption and storage of suitable cleaning, grinding and polishing agents in the interior of the foams. The foams can also be rendered hydrophobic and oleophobic for specific duties, for example by impregnation with silicone and fluorocarbon emulsions. Owing to the extremely low emissions of formaldehyde, the foams of the present invention can also be used in the hygiene sector, e.g., in the form of thin mats as a wound dressing or as a constituent of baby diapers, femcare and adult incontinence products.

The melamine-formaldehyde foams obtainable by the processes of the present invention are superior to the previously known melamine-formaldehyde foams especially in having an improved combination of mechanical/resilient properties and flow resistances, i.e., acoustical properties.

The examples which follow illustrate the invention.

EXAMPLES

Materials or examples with a prefixed "V-" are not in accordance with the present invention and are for comparison.

Methods of Measurement:

Ram Pressure Value [N]:

All the ram pressure value measurements for assessing the mechanical/resilient properties of the melamine-formaldehyde foams were carried out as follows: A cylindrical steel ram 8 mm in diameter 10 cm in height was pressed at a right angle into a cylindrical foam sample 11 cm in diameter and 5 cm in height until the foam sample broke. The maximum force (unit: N) exerted by the ram until the foam sample broke is hereinafter also referred to as ram pressure value and provides information about the mechanical/resilient quality of the foam (the values recorded in table 1 are in each case two values separated by "/", the first value of which corresponds to a measurement parallel to the direction of rise of the foam while the second value corresponds to a measurement perpendicular to the direction of rise of the foam). The greater the ram pressure values are, the better the mechanical/resilient properties of the melamine-formaldehyde foams are; the further the values measured on any one melamine-formaldehyde foam parallel and perpendicularly to the direction of rise of the foam differ from each other, the greater the anisotropy is and the worse the homogeneity is of the foam.

Length-based flow resistance r [Pa·s/m$^2$]:

The length-based flow resistance r was determined as per DIN EN ISO 29053 from 1993 (method A). The greater the length-based flow resistance of melamine-formaldehyde foam is, the better the sound absorption capacity of the foam is.

Weight loss [%]/shrinkage [%]:

The weight loss and shrinkage of melamine-formaldehyde foams is a measure of the thermal-oxidative resistance and was determined by 48-hour aging at 260° C. (the values reported in table 1 are in each case two values separated by "/", of which the first value corresponds to the weight loss and the second value corresponds to the shrinkage, each in % of the initial weight and of the initial volume, respectively).

Materials Used:

Melamine-Formaldehyde Precondensates:

mf-1: The melamine-formaldehyde precondensate mf-1 was a spray-dried melamine-formaldehyde precondensate having an average molecular weight (number average) $M_n$ of 370 g/mol, which had a molar ratio of melamine:formaldehyde of 1:3, which apart from melamine comprised no further thermoset-formers and apart from formaldehyde comprised no further aldehydes, and which had a sulfite group content of 2.3 wt %, based on the total weight of the melamine-formaldehyde precondensate.

mf-2: The melamine-formaldehyde precondensate mf-2 was a spray-dried melamine-formaldehyde precondensate having an average molecular weight (number average) $M_n$ of 350 g/mol, which had a molar ratio of melamine:

formaldehyde of 1:3, which apart from melamine comprised no further thermoset-formers and apart from formaldehyde comprised no further aldehydes and which was sulfite group free.

Surfactants:

at-1: The anionic surfactant at-1 was Hostapur® SAS 60 from Clariant (CAS No. 85711-69-9), a commercially available alkanesulfonate mixture of formula (I):

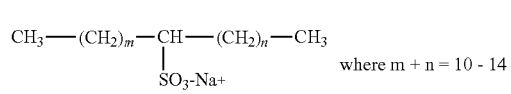

$$CH_3\text{---}(CH_2)_m\text{---}\underset{\underset{SO_3\text{-}Na^+}{|}}{CH}\text{---}(CH_2)_n\text{---}CH_3 \quad \text{where } m + n = 10\text{-}14 \qquad (I)$$

nt-1: Nonionic surfactant nt-1 was Lutensol® AT 80 powder from BASF SE, a commercially available alkyl polyethylene glycol ether mixture obtainable by reacting a linear saturated $C_{16}/C_{18}$ fatty alcohol mixture with an 80-tuply molar excess of ethylene oxide.

Curatives:

h-1: Curative h-1 was concentrated formic acid.

Salts of an Inorganic Acid and/or Salts of an Organic Carboxylic Acid:

z-1: Sodium formate was used as salt of an organic carboxylic acid z-1.

z-2: Sodium citrate was used as salt of an organic carboxylic acid z-2.

Blowing Agents:

t-1: Blowing agent t-1 was a mixture of 80 wt % of n-pentane and 20 wt % of isopentane.

Further Additives:

wa-1: Further additive wa-1 was basic copper carbonate used for heat and UV stabilization.

Inventive and Comparative Examples 1-15

The parts by weight mentioned in table 1 of the starting materials likewise mentioned in table 1 were in each case reacted on a laboratory scale to form melamine-formaldehyde foams as follows: in a first step a), the total amount of the melamine-formaldehyde precondensate, of the water, of the surfactants, of the salts of an inorganic acid and/or salts of an organic carboxylic acid, of the blowing agent and of the further additives were mixed with one another at a temperature of 20 to 35° C. using an Ultra-Turrax® stirring rod, operated at 10 000 rpm, for a period of 1 min while air was mixed, then the total amount of the curative was added and the mixing operation was continued for a further 30 s. The mixture thus obtained was introduced into a foaming mold of polypropylene (dimensions: 20 cm×20 cm×20 cm) and irradiated in a microwave oven with microwave energy having a frequency of 2.45 GHz for a period of 5 min. Within this period of 5 min, the mixture foamed up, the foam became increasingly cured by crosslinking and dried through the expulsion of volatile constituents (process steps b), c) and d)); during the microwave irradiation, the temperature of the mixture and/or of the product foam rose from initially 40° C. to 100° C. To perform process step e), the foam bodies obtained after microwave irradiation were annealed in a circulating air oven at 240° C. for 20 min (process step e)).

The properties of the melamine-formaldehyde foams obtained in each case are reproduced in table 1. An improved combination of mechanical/resilient properties and flow resistances, i.e., acoustical properties, generally requires a melamine-formaldehyde foam to have not only a ram pressure value of ≥20 N but also a length-based flow resistance r of ≥4500 Pa·s/m². Very particularly improved combinations are ram pressure values >30 N, length-based flow resistances >7000 Pa*s/m² and densities <10 g/l.

TABLE 1

Type and quantity of starting materials for production of melamine-formaldehyde foams and properties of these foams

| Example | 1 | 2 | V-3 | V-4 | V-5 | V-6 | 7 | 8 |
|---|---|---|---|---|---|---|---|---|
| Composition [parts by weight] | | | | | | | | |
| mf-1 | 100 | — | 100 | 100 | 100 | 100 | 100 | 100 |
| mf-2 | — | 100 | — | — | — | — | — | — |
| at-1* | 1.24 | 1.24 | 1.24 | 1.24 | 1.54 | — | 1.24 | 1.24 |
| nt-1* | 0.30 | 0.30 | 0.30 | 0.30 | — | 1.54 | 0.30 | 0.30 |
| z-1 | 0.75 | 2.75 | 0.75 | 0.75 | 0.75 | 0.75 | 1.38 | — |
| z-2 | 0.63 | — | 0.63 | 0.63 | 0.63 | 0.63 | — | 1.38 |
| h-1 | 3.0 | 3.0 | 3.0 | 3.0 | 3.0 | 3.0 | 3.0 | 3.0 |
| t-1 | 18 | 18 | 18 | 18 | 18 | 18 | 18 | 18 |
| wa-1 | 0.06 | — | 0.06 | 0.06 | 0.06 | 0.06 | 0.06 | 0.06 |
| Water | 38.75 | 38.75 | 21.95 | 61.29 | 38.75 | 38.75 | 38.75 | 38.75 |
| Properties | | | | | | | | |
| Ram pressure value [N] | 32/34 | 35/32 | 3/5 | 2/4 | 7/11 | 2/3 | 35/32 | 24/28 |
| Length-based flow resistance r [Pa · s/m²] | 8400 | 9200 | 4400 | 7900 | 3800 | 172 000 | 6800 | 4600 |
| Density [g/l] | 11 | 10 | 12 | 13 | 12 | 14 | 10 | 11 |
| Weight loss [%]/ shrinkage [%] | 28/20 | n.d. | n.d. | n.d. | n.d. | n.d. | n.d. | n.d. |
| Example | | V-9 | V-10 | V-11 | 12 | 13 | 14 | 15 |
| Composition [parts by weight] | | | | | | | | |
| mf-1 | | 100 | 100 | 100 | 100 | 100 | 100 | 100 |
| mf-2 | | — | — | — | — | — | — | — |
| at-1* | | 1.24 | 1.24 | 1.24 | 1.24 | 1.24 | 1.24 | 1.24 |

TABLE 1-continued

Type and quantity of starting materials for production of
melamine-formaldehyde foams and properties of these foams

| | | | | | | | |
|---|---|---|---|---|---|---|---|
| nt-1* | 0.30 | 0.30 | 0.30 | 0.30 | 0.30 | 0.30 | 0.30 |
| z-1 | — | 0.75 | 0.75 | 0.75 | 0.75 | 0.75 | 0.75 |
| z-2 | — | 0.63 | 0.63 | 0.63 | 0.63 | 0.63 | 0.63 |
| h-1 | 3.0 | 1.5 | 4.5 | 3.0 | 3.6 | 3.0 | 3.0 |
| t-1 | 18 | 18 | 18 | 9 | 27 | 18 | 18 |
| wa-1 | 0.06 | 0.06 | 0.06 | 0.06 | 0.06 | — | 0.03 |
| Water | 38.75 | 38.75 | 38.75 | 38.75 | 38.75 | 38.75 | 38.75 |
| Properties | | | | | | | |
| Ram pressure value [N] | 15/18 | 13/11 | 3/4 | 23/21 | 22/26 | 30/28 | 29/33 |
| Length-based flow resistance r [Pa·s/m$^2$] | 24 800 | 2800 | 13 900 | 7900 | 4500 | 6900 | 7400 |
| Density [g/l] | 10 | 9 | 14 | 17 | 8 | 10 | 11 |
| Weight loss [%]/ shrinkage [%] | n.d. | n.d. | n.d. | n.d. | n.d. | 47/63 | 35/30 |

(prefixed V: for comparison;
n.d.: not determined;
*surfactants reckoned as solid material)

Example 16

The parts by weight mentioned in Example 1 of table 1 of the starting materials likewise mentioned there were reacted on a manufacturing scale to form melamine-formaldehyde foams as follows:

In a stirred tank having an upwardly directed stirring finger, the total amount of the melamine-formaldehyde precondensate and the total amount of water and the total amount of salts of an inorganic acid and/or salts of an organic carboxylic acid and 10% of the total amount of the surfactant mixture, prepared separately from the anionic surfactant and the nonionic surfactant, and the total amount of the further additives were mixed in a continuous process at atmospheric pressure and a temperature of 30° C. Concurrently with the production of this sub-mixture in a stirred tank, a second sub-mixture was produced in a technically separate way by, in each case via metering pumps, the total amount of the blowing agent and 90% of the total amount of the surfactant mixture being mixed with one another in a packed tube at a pressure of 10 bar and a temperature of 5° C. while nitrogen was continuously blown into this second sub-mixture at a pressure of 15 bar. The sub-mixture obtained in the stirred tank and the sub-mixture obtained in the packed tube were continuously fed to a twin-screw extruder and mixed with one another at temperatures of initially 15° C. then rising to 60° C. and a pressure of 8 bar. This mixture was discharged from the twin-screw extruder and fed directly to a static mixer into which the total amount of the curative was metered at the same time to form the mixture M1). The mixing of all components to form the mixture M1) took place in this static mixer at temperatures of 65° C. and a pressure of 8 bar. This mixture M1), obtained in process step a), was then fed via a die at a flow rate of 560 kg/h continuously to a horizontally disposed foaming channel which had a negative pressure of 2 mbar relative to the ambient pressure and in which process steps b), c), d) and e) were carried out in a continuous manner. The mixture M1) was under a pressure of 8 bar immediately before being injected into the foaming channel and had a temperature of 65° C. The foaming channel was formed by a backwall wherethrough the die fed the mixture M1) into the foaming channel, and four sidewalls adjoining the backwall which were arranged perpendicularly to one another, so they formed a closed right-angled cross section, and wherein the foaming channel was open at the side opposite the backwall. The die was disposed in the lower third of the backwall and centrally between the two lateral sidewalls of the foaming channel and was embodied as slot die. Process step b), of heating and foaming the mixture M1) using microwave radiation, took place directly after the mixture M1) had been injected into the foaming channel. The foam strand which forms in the foaming channel in process step a) was then transported through the foaming channel in which the further steps b), c), d) and e) were carried out in a continuous manner. The four sidewalls of the foaming channel were each embodied as circulating belts which moved from the dosing point of mixture M1) in the direction of the open side of the foaming channel at a constant speed of 0.83 m/min which was the same for all four belts. The circulating belts were polyester belts which had a polyorganosiloxane coating as anti-stick layer on the sides adjacent to the foam. The circulating belts were supported by external supporting metal sheets and were guided by rails. The backwall of the foaming channel consisted of polypropylene. The foaming channel had a rectangular cross section and an overall length of 46 m, a width of 1.4 m and a height of 0.6 m. Every outside surface of the upper circulating belts and of the lower circulating belts of the foaming channel was equipped with two mutually offset rows of 14 microwave irradiation devices each, wherein the individual irradiation devices were separated from one another by a distance which corresponded to the wavelength of the irradiated microwave radiation. The distance between the backwall of the foaming channel comprising the die wherethrough the mixture M1) was fed into the foaming channel and the first device for irradiation of microwave radiation was 100 cm. Heating and foaming the mixture M1) as per process step b) took place essentially in a region amounting to 0 to 15% of the total length of the foaming channel, crosslinking and curing of the product foam as per process step c) took place essentially in a subsequent region amounting to 15 to 35% of the total length of the foaming channel, drying the foam as per process step d) took place essentially in a subsequent region amounting to 35 to 50% of the total length of the foaming channel using 135 microwaves which were incident on a length of 6 m in uniform distribution across the full width, and the annealing of the dried foam as per process step e) took place essentially in a final region amounting to 50 to 100% of the total length of the foaming channel, wherein the percent values mentioned are based on the total length of the foaming channel and 0% represents the backwall of the foaming channel and 100% represents the open end, opposite the backwall, of the foaming channel; here the above formulations "essentially" reflect the fact that, as already elucidated at the beginning, the individual steps b) to e) were in practice not sharply delimited from each other but to a certain degree transitioned into each other continuously and/or took place concurrently. The irradiation intensity of each and every device for irradiation of microwave radiation was controllable independently. The microwave radiation had a frequency of 2.45 GHz. The energy absorbed by the foam across the full length of the foaming channel, in each of which process steps b), c) and d) took place, was about 1000 Wh, based on 1 kg of water in the mixture M1). The microwave radiation was pulsed at the particular maximum power output of the magnetrons used, the power input was controlled via the number and duration of pulses. Process step e) comprised annealing the dried foam with hot air having a temperature of 180 to 240° C. and having a flow rate of 4000 S.T.P. m$^3$/m$^2$ of permeated foam area/h (where S.T.P. conditions conform to DIN 1343). The region of the foaming channel envisioned for performing process step e) was for this equipped with multiple circulating fans and electric heaters which blew hot air downwardly through the foam strand, and also with multiple exit air devices whereby the hot air was removed from the foaming channel. The feed air was introduced at multiple points and preheated in some instances. Heating and foaming the mixture M1) as per process step b) took place at a temperature of about 70° C. The crosslinking and curing of the product film as per process step c) took place at a temperature of about 90° C. Drying the foam as per process step d) took place at a temperature of about 120°. Annealing the dried foam as per process step e) took place at a temperature of about 240°. Heating and foaming the mixture M1) as per process step b) took place over a period of 2.5 min. Crosslinking and curing the product foam as per process step c) took place over a period of 20 min. Drying the foam as per process step d) took place over a period of 10 min. Annealing the dried foam as per process step e) took place over a period of 24 min. The foaming channel was supplied in the regions in which process step c) took place with preheated nitrogen via multiple feed points on the bottom side of the foaming channel, while off-gases were removed via multiple removal points at the top side of the foaming channel. The feeding of nitrogen ensured that the oxygen concentration limit was never breached in section d). The oxygen content was kept under constant surveillance using an NIR laser spectrometer. In process steps b), c) and e), multiple feed points on the top side of the foaming channel supplied air, which was preheated in some instances, while off-gases were removed via multiple removal points. The blowing agent content was continuously determined by online IR spectroscopy and always kept below the lower explosion limit of the blowing agent by feeding air. The off-gases removed from the foaming channel were flared off. The annealed strand of foam obtained after process step e) and emerging continuously from the foaming channel was severed with a sawing device perpendicularly to the direction of the foaming channel after a strand length of 2 m in each case, so foam cuboids having a width and height predetermined by the dimensions of the foaming channel were obtained. These foam cuboids were placed in a ram press and subjected to one cycle of compression down to 15% of their initial height and relaxation back to their initial height.

The melamine-formaldehyde foam thus obtained on a manufacturing scale was likewise subjected to measurements of the ram pressure value, of the length-based flow resistance r, of the density, of the weight loss and of the shrinkage. The measured values were in each case identical, within the margins of error, with those which were obtained for the melamine-formaldehyde foam obtained on a laboratory scale and as reported in Example 1 of table 1.

The examples show that the melamine-formaldehyde foams obtainable by the processes of the present invention are superior to known melamine-formaldehyde foams by having an improved combination of, in particular, mechanical/resilient properties and flow resistances, i.e., acoustical properties.

We claim:

1. A process for producing a melamine-formaldehyde foam, said process comprising the steps of:
   a) producing an aqueous mixture M1) comprising
      100 parts by weight of at least one melamine-formaldehyde precondensate,
      2 to 4 parts by weight of at least one curative,
      0.2 to 5 parts by weight of a surfactant mixture,
      0.1 to 5 parts by weight of at least one salt of an inorganic acid and/or at least one salt of an organic carboxylic acid,
      1 to 40 parts by weight of at least one blowing agent,
      0 to 5 parts by weight of at least one dye and/or optical brightener,
      0 to 20 parts by weight of one or more further additives, and
      25 to 60 parts by weight of water,
   b) heating and foaming said mixture M1) using microwave radiation,
   c) crosslinking and curing the resulting foam using the curative and microwave radiation,
   d) drying the foam using microwave radiation, and
   e) annealing the dried foam using hot air,
   wherein said mixture M1) comprises a surfactant mixture comprising a mixture of 50 to 90 wt % of an anionic surfactant and 10 to 50 wt % of a nonionic surfactant, wherein the weight percentages are each based on the total weight of the surfactant mixture;
   wherein said mixture M1) is continuously fed to a horizontally disposed foaming channel in which steps b), c), d) and e) are carried out continuously; and
   wherein the foaming channel is supplied with air and/or nitrogen via one or more feed points and rid of off-gases via one or more removal points.

2. The process according to claim 1 wherein said mixture M1) comprises a surfactant mixture comprising a mixture of 50 to 90 wt % of an anionic surfactant of formula (I) and 10 to 50 wt % of nonionic surfactants obtained by reacting a linear saturated $C_{12}$-$C_{18}$ fatty alcohol with a 30 to 120-tuply molar excess of ethylene oxide, wherein the weight percentages are each based on the total weight of the surfactant mixture.

3. The process according to claim 1 wherein said mixture M1) comprises a surfactant mixture comprising a mixture of 50 to 90 wt % of an anionic surfactant of formula (II)

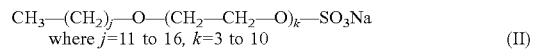

and 10 to 50 wt % of nonionic surfactants obtained by reacting a linear saturated $C_{12}$-$C_{18}$ fatty alcohol with a 30 to 120-tuply molar excess of ethylene oxide, wherein the weight percentages are each based on the total weight of the surfactant mixture.

4. The process according to claim 1 wherein step a) utilizes a melamine-formaldehyde precondensate having a molar ratio of melamine: formaldehyde ranging from 1:1.5 to 1:4 and an average molecular weight (number average) $M_n$ ranging from 200 g/mol to 1000 g/mol.

5. The process according to claim 1 wherein step a) utilizes formic acid as curative.

6. The process according to claim 1 wherein step a) utilizes a blowing agent comprising a mixture of 30 to 90 wt % of n-pentane and 70 to 10 wt % of isopentane, wherein the weight % ages are each based on the total weight of the blowing agent.

7. The process according to claim 1 wherein said mixture M1) comprises one or more compounds selected from the group consisting of sodium and potassium formates, acetates, citrates, chlorides, bromides, sulfates, sulfites, nitrates and dihydrogenphosphates as salts of an inorganic acid and/or salts of an organic carboxylic acid in step a).

8. The process according to claim 1 wherein step a) utilizes a melamine-formaldehyde precondensate having a sulfite group content, reckoned as $—SO_3$ and based on the total weight of the melamine-formaldehyde precondensate, ranging from 0.1 to 3 wt % and wherein said mixture M1) comprises 0.01 to 5 parts by weight of a UV and/or heat stabilizer as further additive.

9. The process according to claim 1 wherein air and/or nitrogen is mixed into said mixture M1) before step b).

10. The process according to claim 1 wherein said mixture M1) is produced in step a) by producing a first sub-mixture from water, melamine-formaldehyde precondensate and salts of an inorganic acid and/or salts of an organic carboxylic acid in a stirred tank, producing a second sub-mixture from the surfactant mixture and the blowing agent in a static or dynamic mixer, then mixing the two sub-mixtures and, if present, dye and further additives together in an extruder or some other dynamic mixer, and finally adding the curative in a further static or dynamic mixer.

11. The process according to claim 10 wherein air and/or nitrogen is mixed in during the step of producing the second sub-mixture in the static or dynamic mixer and/or during the step of mixing the two sub-mixtures in the extruder or other dynamic mixer.

12. The process according to claim 1 wherein the foaming channel is formed by a backwall wherethrough said mixture M1) is fed to the foaming channel using a die, and four sidewalls which adjoin the backwall and which are disposed perpendicularly to each other, so they form a closed right-angled cross section and the foaming channel is open at the side opposite the backwall.

13. The process according to claim 12 wherein the four sidewalls of the foaming channel are belts moving at a constant speed, which is the same for all four belts, ranging from 0.2 m/min to 2 m/min from the dosing point of mixture M1) in the direction of the open side of the foaming channel.

14. The process according to claim 12 wherein the sidewalls and the backwall of the foaming channel consist of a polyolefin or a polyester and the sides of the sidewalls and/or of the backwall which are adjacent to the foam have a potyorganosiloxane or polytetrafluoroethane coating.

15. The process according to claim 12 wherein the sidewalls and/or the backwall of the foaming channel are equipped on the side which is adjacent to the foam with a polymeric foil which is exchangeable during the foaming operation.

16. The process according to claim 1 wherein the foaming channel of rectangular cross section has a width ranging from 1.0 m to 2 m and a height ranging from 0.3 m to 0.7 m.

17. The process according to claim 12 wherein the outside surfaces of the sidewalls of the foaming channel are equipped with two or more devices for irradiation of the microwave radiation used in steps b), c) and d), said devices being spaced apart from each other by an amount which corresponds to the wavelength of the irradiated microwave radiation.

18. The process according to claim 1 wherein said annealing in step e) is effected with hot air at a flow rate ranging from 500 to 5000 S.T.P. $m^3/m^2$ of permeated foam area/h (where S.T.P. conditions conform to DIN 1343).

19. The process according to claim 1 wherein said heating and foaming said mixture M1) as per step b) is effected in a temperature range from 40° C. to 100° C.

20. The process according to claim 1 wherein crosslinking and curing the resulting foam as per step c) is effected in a temperature range from 50° C. to 110° C.

21. The process according to claim 1 wherein said drying the foam as per step d) is effected in a temperature range from 100° C. to 200° C.

22. The process according to claim 1 wherein said annealing the dried foam as per step e) is effected in a temperature range from 150° C. to 290° C.

23. The process according to claim 1 wherein said heating and foaming said mixture M1) as per step b) is effected over a period of from 0.1 min to 4 min.

24. The process according to claim 1 wherein crosslinking and curing the resulting foam as per step c) is effected over a period of from 2 min to 40 min.

25. The process according to claim 1 wherein said drying the foam as per step d) is effected over a period of from 2 min to 40 min.

26. The process according to claim 1 wherein said annealing the dried foam as per step e) is effected over a period of from 15 min to 150 min.

27. The process according to claim 1 wherein the blowing agent content of the off-gases is determined by measuring devices and serves via regulating devices as control variable for the air and/or nitrogen feed stream such that the lower explosion limit of the blowing agent or the oxygen concentration limit in the foaming channel is not breached.

28. The process according to claim 1 wherein an annealed strand of foam is obtained after step e), which is severed by suitable cutting devices perpendicularly to the direction of the foaming channel to obtain foam cuboids having a width and height dictated by the dimensions of the foaming channel.

29. The process according to claim 1 wherein step e) is followed by a step f) in which the annealed foam is one or more times compressed down to half or less of its initial height and allowed to recover to its initial height.

* * * * *